O. R. AND A. C. MILLER.
NUT LOCK.
APPLICATION FILED OCT. 3, 1919.

1,404,630.

Patented Jan. 24, 1922.

Oscar R. and Aldus C. Miller
INVENTOR.

WITNESS:
Alfred T. Bratton

BY
Victor J. Evans
ATTORNEY.

UNITED STATES PATENT OFFICE.

OSCAR R. MILLER AND ALDUS C. MILLER, OF PHILADELPHIA, PENNSYLVANIA.

NUT LOCK.

1,404,630.  Specification of Letters Patent.  Patented Jan. 24, 1922.

Application filed October 3, 1919. Serial No. 328,143.

*To all whom it may concern:*

Be it known that we, OSCAR R. MILLER and ALDUS C. MILLER, citizens of the United States, residing at Philadelphia, in the county of Philadelphia and State of Pennsylvania, have invented new and useful Improvements in Nut Locks, of which the following is a specification.

This invention relates to nut locks and it has more particular reference to that type of nut lock in which a pawl is mounted in a recess in the nut and adapted in use to impinge the periphery of the bolt when the nut is reversely turned or when said nut tends to work loose, whereby effective locking of the parts is effected.

The main object of our invention is to provide a lock nut of the type referred to which can be readily removed at will and one that will operate to lock the nut effectively should it be applied to a right or to a left handed thread.

A further object of this invention is to provide a lock nut which will effectively eliminate "chattering." With these and other objects in view, as will hereinafter be more fully disclosed, our invention consists essentially in forming in the underside of the nut a recess having communication with the threaded aperture of the nut by means of a passage whose walls are oppositely inclined, said recess housing a rocking pawl, the projecting edge whereof projects slightly beyond the face of the threaded nut.

In the further disclosure of the invention reference is to be had to the accompanying sheets of explanatory drawings constituting a part of this specification, in which similar characters of reference denote the same or corresponding parts in all the views, and in which,—

Figure 1:
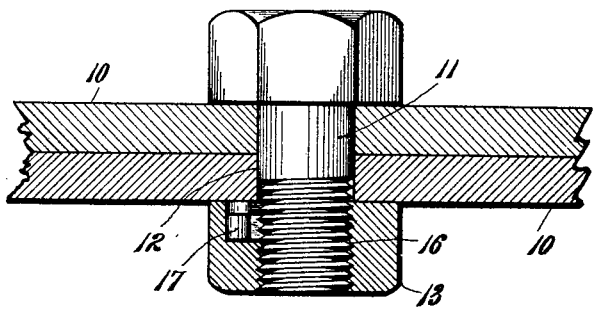

Figure 1— is a longitudinal sectional view showing the lock nut in applied position.

Figure 2:
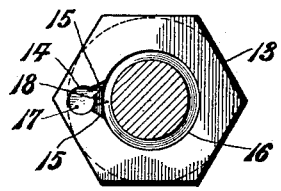
Figure 3:

Figure 2— is an underside plan of the nut with the shank of the bolt shown in cross section, and Figure 3— is a detailed perspective view of the rocking pawl or dog, hereinafter more particularly referred to.

Referring to the drawings the numeral 10 designates two plates or other pieces of material which it is desired to firmly lock together and the numeral 11, a threaded bolt passing through the holes 12 in said plate. A lock nut 13 is provided on its underface with a recess which includes a substantially circular portion 14 and oppositely inclined projecting walls 15—15, these walls communicating with the threaded aperture 16 of said nut. It is to be here particularly noted that the substantially circular portion 14 is formed on a radial line struck from the center of the threaded aperture 16 and the inclined disposed walls 15 are spaced equal distances on each side of said radial line. Snugly fitting in the recess 14 is the correspondingly shaped head 17 of a rockable pawl 18, said pawl being provided with a substantially wedge-shaped projection 19, the knife edge whereof is in line with the axis of the nut and is adapted to project slightly beyond the face of the threaded aperture 16.

Now assuming that the bolt 11 is provided with a right hand thread as shown, and that said bolt has been passed through the plates 10 to be clamped together, the pawl 17 is moved over to the left hand wall 15 whereupon the nut 13 can be threaded down on the shank of the bolt into frictional engagement with the under-face of the lower plate in Figure 1. Any tendency of the nut 13 to chatter or work loose or should some unauthorized person attempt to remove the nut, will cause the operative edge of the wedge-shaped portion 19 to impinge or dig into the threads on the shank of the bolt and thereby prevent the nut from being illicitly or otherwise removed. On the other hand it will be readily understood that in the event of it becoming necessary to remove the nut 13, extra pressure or additional force applied by a wrench or otherwise, to the nut will force the operative edge over to the right hand whereupon said nut can be easily removed.

From the foregoing description taken in connection with the accompanying drawing, it is believed that the construction, operation and advantages of our invention over similar constructions heretofore in use, will be readily understood, but it is desired to particularly emphasize the peculiar and novel formation of the rocking pawl and its disposition. Furthermore whilst we have shown and described our invention as possessing a particular form and construction, we wish it understood that we may make such changes in the formation thereof as do not depart from the spirit and scope of the appended claim.

Having described our invention, we claim—

A device of the class described comprising a nut having a threaded aperture formed therein and provided with a recess having a circular portion disposed on a radial line struck from the center of the threaded aperture and having oppositely inclined projecting walls spaced equal distances upon opposite sides of the radial line between the circular portion and the threaded aperture, and a rockable pawl having a circular head engaging the circular portion of the recess and provided with a longitudinally extending wedge-shaped projection adapted to engage the inclined projecting walls of the recess when the nut is turned in either direction.

In testimony whereof we affix our signatures.

OSCAR R. MILLER.
ALDUS C. MILLER.